US012638687B2

(12) United States Patent
Leppänen et al.

(10) Patent No.: US 12,638,687 B2
(45) Date of Patent: May 26, 2026

(54) CONTROLLING A HEADSET

(71) Applicant: Nokia Technologies Oy, Espoo (FI)

(72) Inventors: Jussi Artturi Leppänen, Tampere (FI);
Lasse Juhani Laaksonen, Tampere
(FI); Arto Juhani Lehtiniemi, Tampere
(FI)

(73) Assignee: NOKIA TECHNOLOGIES OY,
Espoo (FI)

( * ) Notice: Subject to any disclaimer, the term of this
patent is extended or adjusted under 35
U.S.C. 154(b) by 0 days.

(21) Appl. No.: 19/052,399

(22) Filed: Feb. 13, 2025

(65) Prior Publication Data

US 2025/0271680 A1 Aug. 28, 2025

(30) Foreign Application Priority Data

Feb. 22, 2024 (GB) ...................................... 2402511

(51) Int. Cl.
 *G02B 27/01* (2006.01)
 *G02B 27/00* (2006.01)
(52) U.S. Cl.
 CPC ..... *G02B 27/0179* (2013.01); *G02B 27/0093*
 (2013.01); *G02B 27/0172* (2013.01); *G02B*
 *2027/0187* (2013.01)
(58) Field of Classification Search
 CPC ............ G02B 27/0179; G02B 27/0093; G02B
 27/0172; G02B 2027/0187; G02B
 2027/0138; G02B 2027/014; G02B
 2027/0178; G02B 27/017; G02B
 2027/0141; G06F 3/012; G06F 3/013;
 G06F 3/011
 See application file for complete search history.

(56) References Cited

U.S. PATENT DOCUMENTS

| | | | |
|---|---|---|---|
| 9,335,820 B2 | 5/2016 | Wolf et al. | |
| 9,423,870 B2 * | 8/2016 | Teller ...................... | G10L 15/22 |
| 9,740,282 B1 | 8/2017 | McInerny | |
| 11,435,583 B1 | 9/2022 | Pedder et al. | |
| 11,861,255 B1 * | 1/2024 | Ive ........................... | G06F 3/147 |
| 12,175,796 B2 * | 12/2024 | Richter ................... | G06T 11/60 |
| 12,260,146 B2 * | 3/2025 | Kim ....................... | G06F 3/1423 |
| 12,307,066 B2 * | 5/2025 | Sorrentino, III ....... | H04N 7/157 |
| 12,326,560 B2 * | 6/2025 | Fermigier .............. | G02C 7/024 |
| 2010/0079356 A1 * | 4/2010 | Hoellwarth ............ | H04B 1/385 |
| | | | 345/8 |
| 2014/0361977 A1 * | 12/2014 | Stafford ................ | A63F 13/212 |
| | | | 345/156 |
| 2015/0253573 A1 * | 9/2015 | Sako .................... | H04N 13/398 |
| | | | 345/207 |
| 2015/0379896 A1 * | 12/2015 | Yang ...................... | G09B 21/00 |
| | | | 434/112 |
| 2016/0018655 A1 | 1/2016 | Imoto et al. | |

(Continued)

OTHER PUBLICATIONS

Search Report received for corresponding United Kingdom Patent
Application No. 2402511.6, dated Jun. 5, 2024, 9 pages.

(Continued)

*Primary Examiner* — Dmitriy Bolotin
(74) *Attorney, Agent, or Firm* — ALSTON & BIRD LLP

(57) ABSTRACT

An apparatus comprising means for:
 determining whether a user of a headset is looking
 towards a reserved region; and causing adaptation of an
 external visual indication produced by the headset in
 dependence upon the determination.

19 Claims, 5 Drawing Sheets

(56)  References Cited

U.S. PATENT DOCUMENTS

Figure 1A:
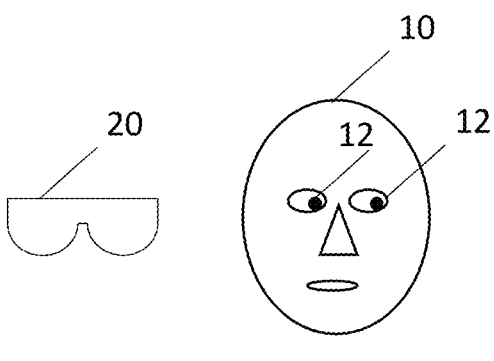

| 2017/0230640 | A1* | 8/2017 | Rochford | ............. | H04N 13/344 |
| 2018/0003983 | A1 | 1/2018 | Sako et al. | | |
| 2018/0024799 | A1* | 1/2018 | Jarvenpaa | .......... | G02B 27/0176 |
| | | | | | 345/156 |
| 2021/0390784 | A1* | 12/2021 | Smith | ................... | G06T 19/006 |
| 2023/0362348 | A1 | 11/2023 | Matsuda et al. | | |

OTHER PUBLICATIONS

Extended European Search Report received for corresponding European Patent Application No. 25153029.1, dated Jun. 2, 2025, 9 pages.

* cited by examiner

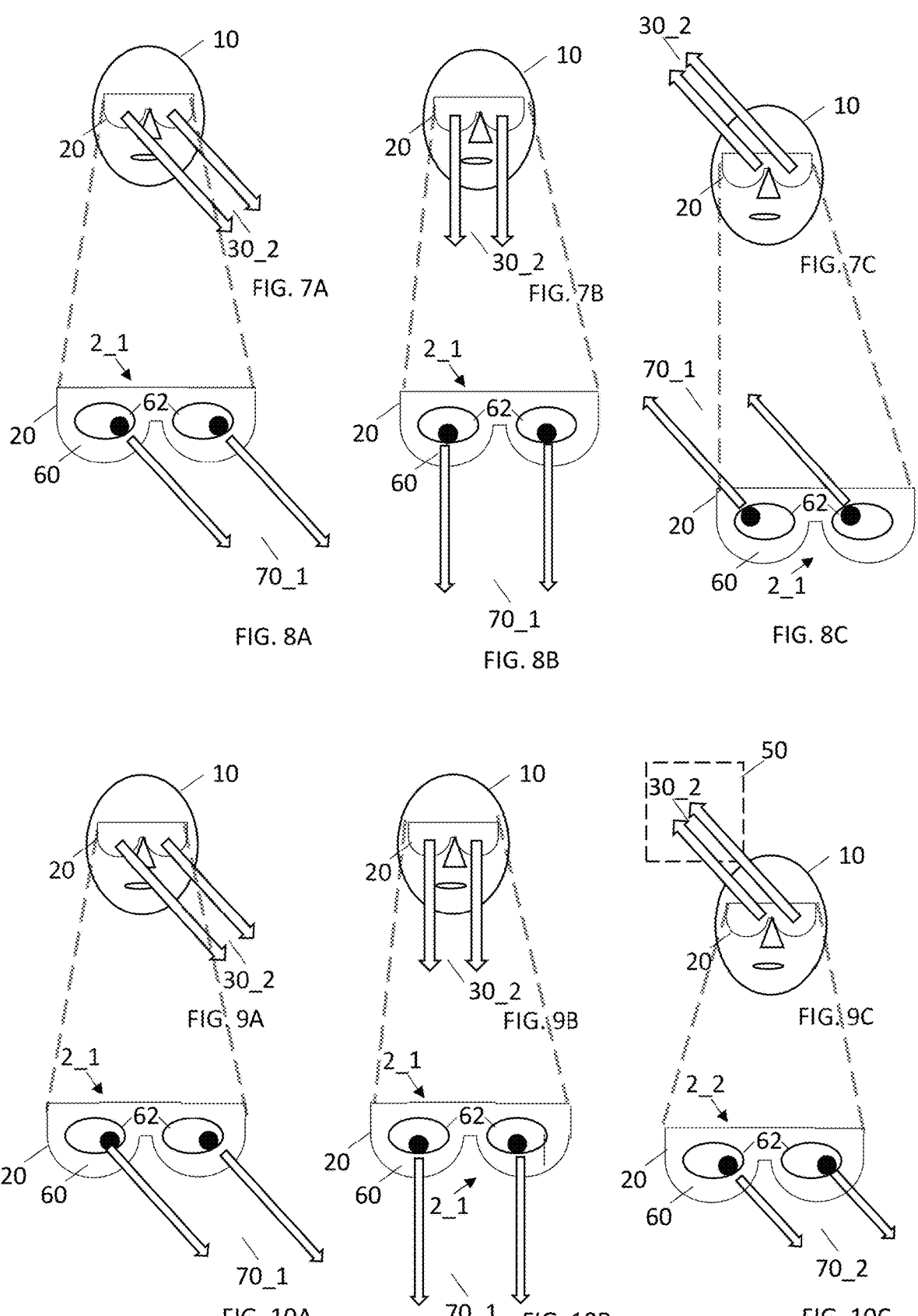

400

CONTROLLING A HEADSET

RELATED APPLICATION

This application claims priority to Great Britain Patent Application No. 2402511.6, filed on Feb. 22, 2024, which is incorporated herein by reference in its entirety.

TECHNOLOGICAL FIELD

Examples of the disclosure relate to controlling a headset. Some relate to controlling a headset that is being used to render augmented reality to a user.

BACKGROUND

A user can wear a headset for various reasons. For example, a headset can be used to provide augmented reality where visual virtual content is displayed as an overlay on the real-world.

In some examples, a headset displays content to the eyes of the user via an internal headset display. This can enable augmented reality where virtual content overlays real-world content. The real-world content can be captured using a camera and rendered via the internal headset display or, alternatively, real-world content can be viewed through the inside display of the headset if is transparent or semi-transparent.

A headset, in use, is worn on a head of the user covering the user's eyes. In some examples the headset encloses the user's eyes and in other examples the headset is in front of the user's eyes. The headset can have the appearance of glasses, goggles, spectacles, a helmet etc.

In some examples, the eyes of the user are entirely obscured by the headset and are not visible through the headset. The headset is, for example, opaque in front of the eyes of the user. In some examples, the eyes of the user are partially obscured by the headset and are only partially visible through the headset. The headset is, for example, partially opaque and partially transparent in front of the eyes of the user.

BRIEF SUMMARY

The inventors have realized that it can be confusing to others if a user of a headset appears to be looking at a region of the real-world when in fact the user of the headset is looking at content displayed to the user by the headset, for example, augmented reality content.

According to various, but not necessarily all, examples there is provided an apparatus comprising means for:

determining whether a user of a headset is looking towards a reserved region; and causing adaptation of an external visual indication produced by the headset in dependence upon the determination.

In some but not necessarily all examples, the apparatus comprises means for determining that the user of the headset is not looking towards a reserved region, and causing the external visual indication produced by the headset to indicate a direction the user is looking.

In some but not necessarily all examples, the apparatus comprises means for determining that the user of the headset is looking towards a reserved region, and causing the external visual indication produced by the headset to indicate a direction the user is not looking.

In some but not necessarily all examples, a direction in which a user of the headset is looking is determined from eye tracking information.

In some but not necessarily all examples, the reserved region is variable in space and time and is dependent upon external presence detection information that comprising information about presence external to the headset.

In some but not necessarily all examples, the reserved region is dependent upon a presence of an external real-world object and tracks a location of the external real-world object.

In some but not necessarily all examples, the reserved region is dependent upon a presence of an animal or human and tracks a location of the animal or human.

In some but not necessarily all examples, the reserved region is dependent upon a presence of an animal or human and tracks a location of eyes of the animal or human.

In some but not necessarily all examples, the external visual indication is provided by a display on an external portion of the headset, wherein the means for causing adaptation of an external visual indication by the headset in dependence upon the determination comprises means for causing adaptation of an image of eyes displayed on the external portion of the headset in dependence upon the determination.

In some but not necessarily all examples, the means for causing adaptation of an image of eyes displayed on the external portion of the headset is configured to cause the displayed eyes to look in a simulated user viewing direction.

In some but not necessarily all examples, the means for causing adaptation of an image of eyes displayed on the external portion of the headset is configured to cause the displayed eyes to look in a direction that no longer matches the direction the user is looking.

In some but not necessarily all examples, the means for causing adaptation of an image of eyes displayed on the external portion of the headset is configured to cause the displayed eyes to look in a direction that is offset from the direction the user is looking such that the displayed eyes look in a direction that is outside the reserved region when the eyes of the user are looking towards the reserved region.

In some but not necessarily all examples, the apparatus is configured to:

if eyes of a user of a headset are looking outside the reserved region, to display eyes on an external portion of the headset that look in a direction that matches a direction in which the eyes of the user are looking; and if eyes of a user of a headset are looking towards the reserved region, to display eyes on the external portion of the headset that look in a direction that is outside the reserved region.

In some but not necessarily all examples, the apparatus is configured to:

if eyes of a user of a headset are looking outside the reserved region, to display eyes on an external portion of the headset that look in a direction that matches a direction in which the eyes of the user are looking; and if eyes of a user of a headset are looking towards the reserved region for longer than a threshold time period, to display eyes on the external portion of the headset that look in a direction that is outside the reserved region.

In some but not necessarily all examples, the direction that is outside the reserved region is determined based on:
a randomized direction;
a previous direction in which the eyes of the user looked;
a selected direction; and
a direction dependent upon external presence detection information.

In some but not necessarily all examples, the direction that is outside the reserved region is varied in time such that the displayed eyes look in a sequence different directions that are outside the reserved region while the eyes of the user are looking towards the reserved region.

In some but not necessarily all examples, the sequence of different directions is based on one or more of:
at least one randomized direction;
at least one previous direction in which the eyes of the user looked;
at least one selected direction; and
at least one direction dependent upon external presence detection information.

In some but not necessarily all examples, the sequence of different directions is a previous sequence of directions in which the eyes of the user looked, repeated as a loop.

In some but not necessarily all examples, the apparatus is configured to cause the adaptation of the external visual indication produced by the headset either in dependence upon the determination that the user of the headset is looking towards the reserved region or in dependence upon a user-selectable option, wherein selection of the user selectable option causes the external visual indication produced by the headset to incorrectly indicate a direction the user is looking irrespective of whether the user of the headset is or is not looking towards the reserved region.

In some but not necessarily all examples, the apparatus is configured as the headset.

According to various, but not necessarily all, examples there is provided a method comprising:
determining whether a user of a headset is looking towards a reserved region; and
causing adaptation of an external visual indication produced by the headset in dependence upon the determination.

According to various, but not necessarily all, examples there is provided a computer program comprising instructions that when executed by one or more processors of an apparatus cause:
determining whether a user of a headset is looking towards a reserved region; and
causing adaptation of an external visual indication produced by the headset in dependence upon the determination.

According to various, but not necessarily all, examples there is provided an apparatus comprising means for:
providing an external visual indication to be produced by a headset that indicates a user viewing direction;
determining whether a user of the headset is looking towards a reserved region; and
causing, in dependence upon the determining, adaptation of the external visual indication produced by the headset.

According to various, but not necessarily all, examples there is provided an apparatus comprising means for:
determining whether a user of a headset is looking towards a reserved region; and
causing, in dependence upon the determining, adaptation of an external visual indication for indicating a user viewing direction, produced by the headset.

The term "for indicating a user viewing direction" requires suitability for indicating a user viewing direction, not necessarily always used for indicating a user viewing direction. The adaptation may result in indication of a viewing direction, for example a change in viewing direction. The adaptation may result in indication of no viewing direction, for example a change from indicating a viewing direction to not indicating a viewing direction.

According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Figure 1B:
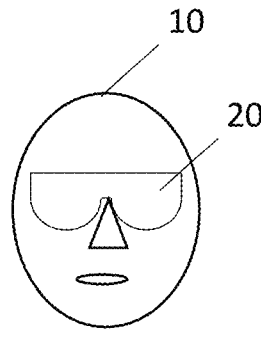
Figure 11:
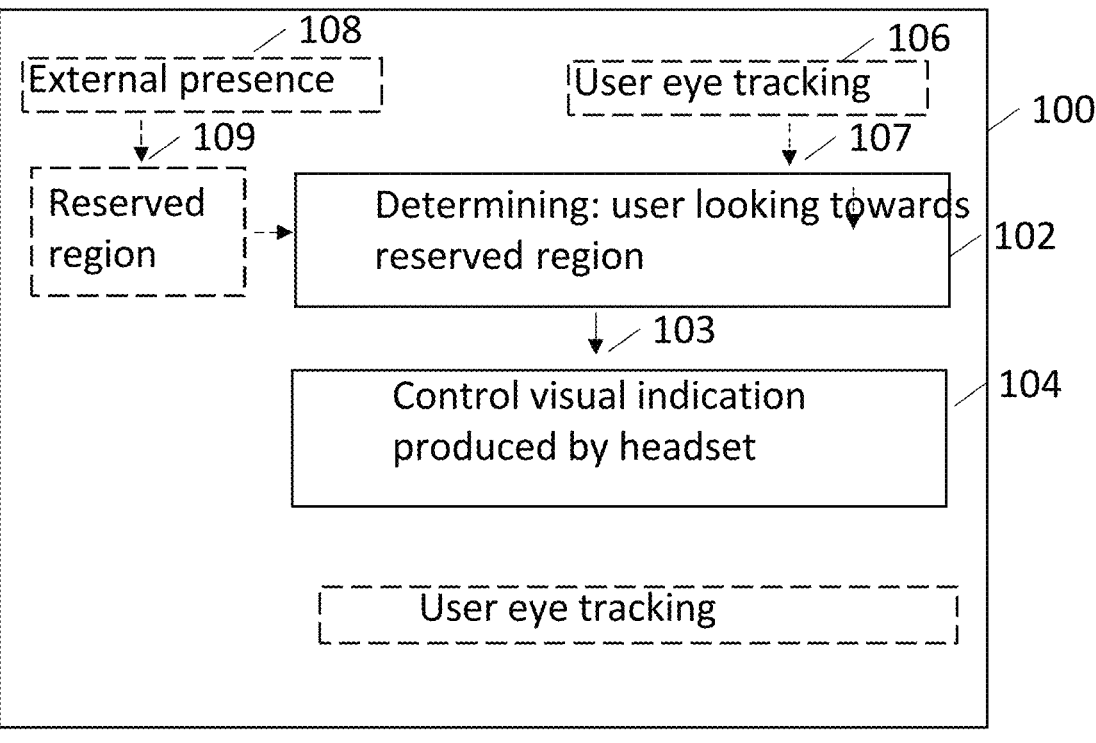
Figure 12:
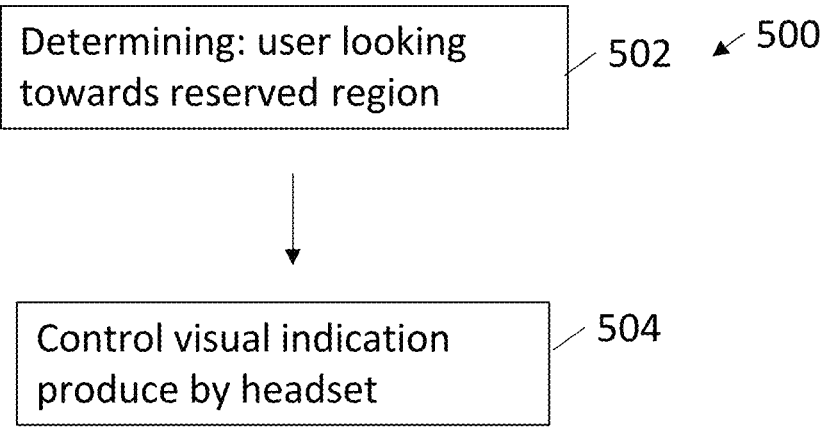
Figure 13:
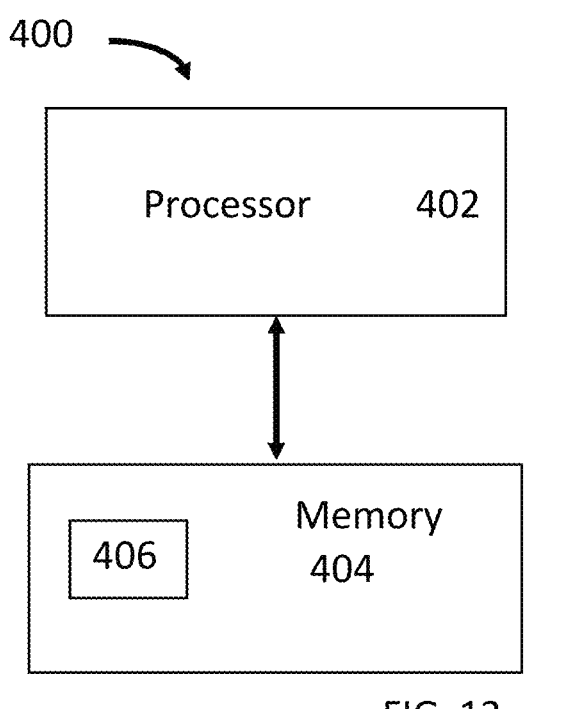
Figure 14:
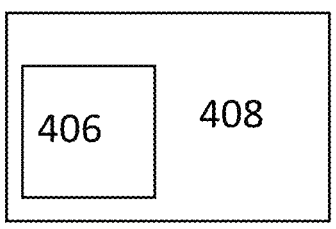

Some examples will now be described with reference to the accompanying drawings in which:
FIG. 1A shows an example of a headset 20;
FIG. 1B shows an example of a headset 20 in use;
FIG. 2A, 2B, 3A, 3B illustrate user viewing directions 30 and a reserved region 50;
FIG. 4A, 4B, 4C; 5A, 5B, 5C; 6A, 6B, 6C illustrate external visual indication 2 tracking the user viewing directions 30 except where the user viewing direction 30 is towards a reserved region 50; and
FIG. 7A, 7B, 7C; 8A, 8B, 8C; 9A, 9B, 9C; 10A, 10B, 10C illustrate external visual indication 2 (displayed, simulated eyes 62) tracking the user viewing directions 30 except where the user viewing direction 30 is towards a reserved region 50; and
FIG. 11 shows an example of an apparatus for controlling the external visual indication 2 in dependence upon the user viewing direction 30 and its relationship with respect to reserved region(s) 50;
FIG. 12 shows an example of a method for controlling the external visual indication 2 in dependence upon the user viewing direction 30 and its relationship with respect to reserved region(s) 50;
FIG. 13 shows an example of a controller for controlling the external visual indication 2 in dependence upon the user viewing direction 30 and its relationship with respect to reserved region(s) 50;
FIG. 14 shows an example of a computer program 406 for controlling the external visual indication 2 in dependence upon the user viewing direction 30 and its relationship with respect to reserved region(s) 50.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the following description a class (or set) can be referenced using a reference number without a subscript index (e.g. 2, 30, 42, 70) and a specific instance of the class (member of the set) can be referenced using the reference number with a numerical type subscript index (e.g. $2\_1$, $2\_2$; $30\_1$, $30\_2$; $42\_1$, $42\_2$; $70\_1$, $70\_2$) and a non-specific instance of the class (member of the set) can be referenced using the reference number with a variable type subscript index (e.g. $2\_i$, $30\_i$, $42\_i$, $70\_i$).

DETAILED DESCRIPTION

The following disclosure relates to examples where an apparatus 100 determines whether a user 10 of a headset 20 is looking towards a reserved region 50 and causes adaptation of an external visual indication 2 produced by the headset 20 in dependence upon the determination.

FIG. 1A illustrates an example of a headset 20 for use by a user 10. The headset 20, in use, is worn on a head of the user 10, covering the user's eyes 12. FIG. 1B illustrates the user 10 wearing the headset 20. The eyes 12 of the user 10 are covered by the headset 20. In some examples the headset 20 encloses the user's eyes and in other examples the headset 20 is in front of the user's eyes. The headset 20 can have the appearance of glasses, goggles, spectacles, helmet etc.

In some examples, the eyes 12 of the user 10 are entirely obscured by the headset 20 and are not visible through the headset 20. The headset 20 is, for example, opaque in front of the eyes 12 of the user 10.

In some examples, the eyes 12 of the user 10 are partially obscured by the headset 20 and are only partially visible through the headset 20. The headset 20 is, for example, partially opaque and partially transparent in front of the eyes 12 of the user 10.

FIG. 2A, 2B, 3A, 3B illustrate examples where a user viewing direction 30 is detected by the headset 20.

Figure 2A:
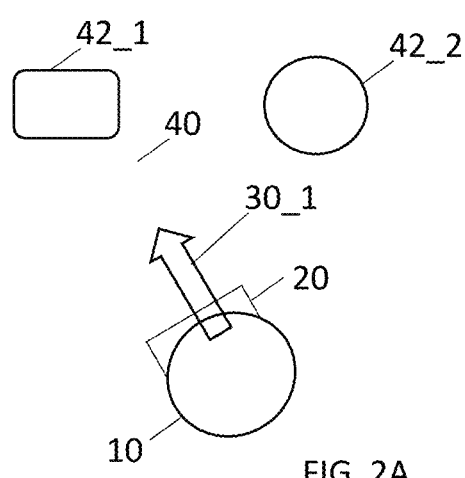
Figure 2B:
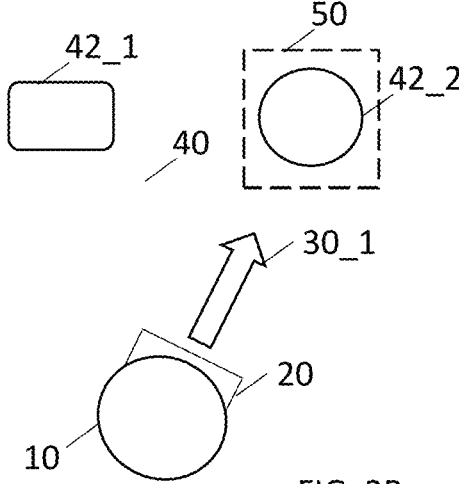

In FIGS. 2A and 2B the user viewing direction 30 is detected by at least an orientation of the headset 20. In FIG. 2A the orientation of the user 10 and the user viewing direction $30\_1$ are aligned and towards object $42\_1$ in the real-world 40. In FIG. 2B the orientation of the user 10 has changed and there is a corresponding change in the user viewing direction $30\_1$. In FIG. 2B the orientation of the user 10 and the user viewing direction $30\_1$ are aligned and towards object $42\_2$ in the real-world 40.

Figure 3A:
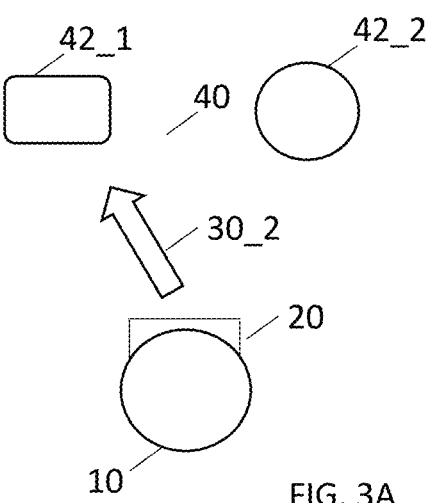
Figure 3B:
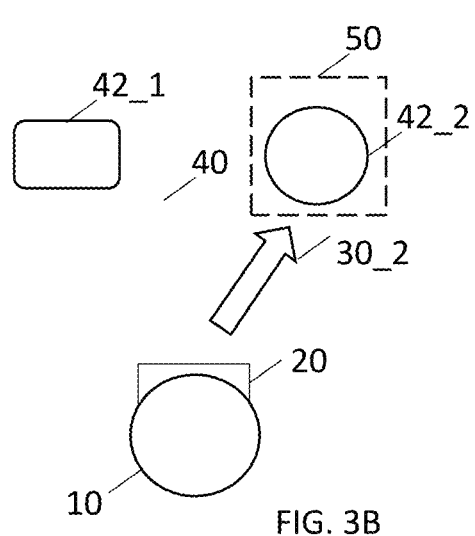
Figures 4A, 4B, 4C, 5A, 5B, 5C, 6A, 6B, 6C:
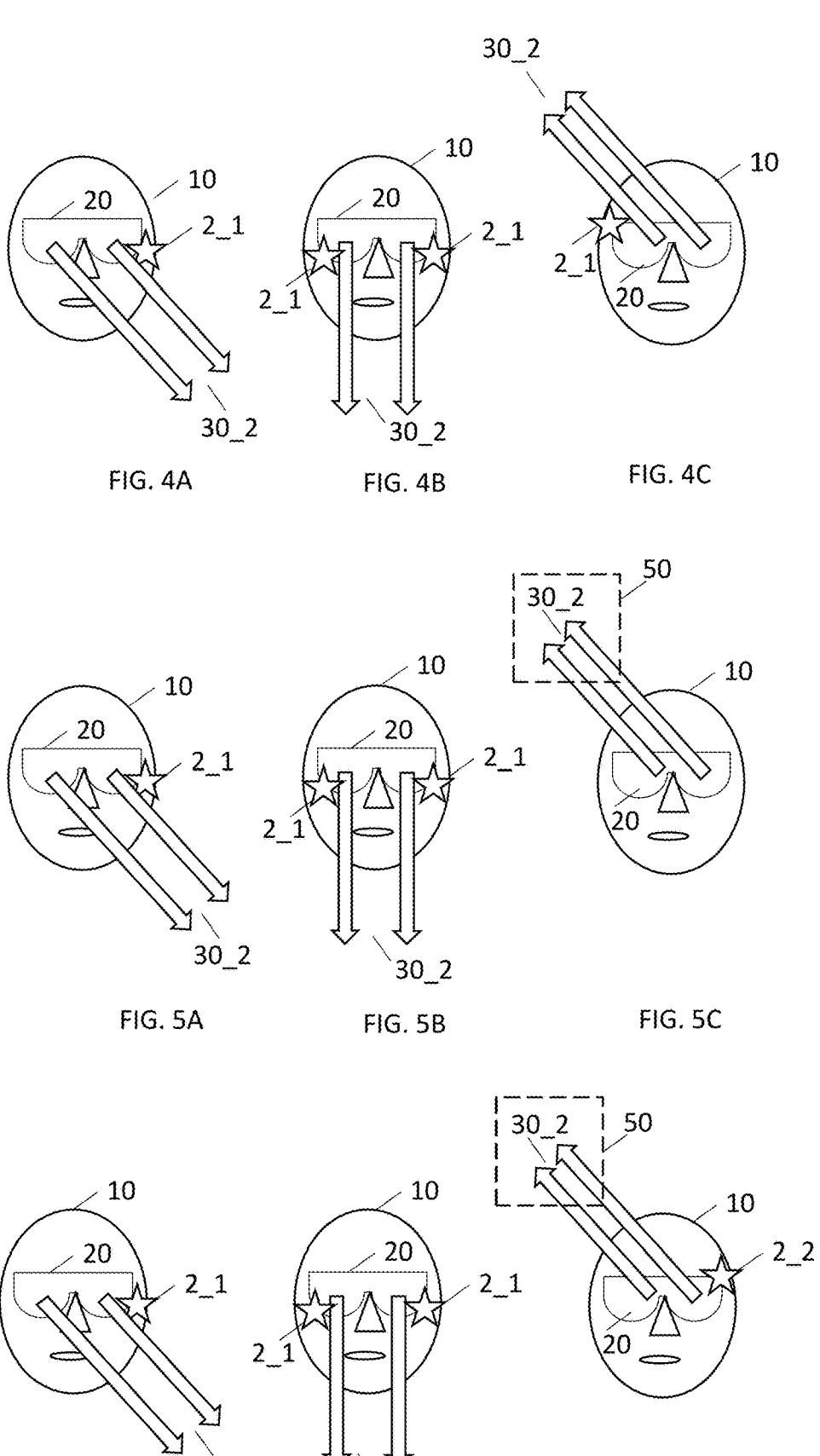

In FIGS. 3A and 3B the user viewing direction 30 is detected by detecting a direction in which the eyes 12 of the user 10 are looking (eyes 12 not illustrated). The orientation of the headset 20 does not change between FIG. 3A and FIG. 3B but the direction of gaze of the eyes 12 of the user 10 do change. In FIG. 3A the user viewing direction $30\_2$ is aligned with the gaze direction of the user and is towards object $42\_1$ in the real-world 40. In FIG. 3B the gaze direction (the direction in which the eyes 12 of the user are looking) has changed and there is a corresponding change in the user viewing direction $30\_2$. In FIG. 3B the gaze direction of the user 10 and the user viewing direction $30\_2$ are aligned and towards object $42\_2$ in the real-world 40.

In some examples, the user viewing direction 30 is dependent upon both an orientation of the headset 20 relative to the real-world and a gaze direction of the user (the direction in which the eyes 12 of the user are looking) relative the headset 20. This, provides a user viewing direction 30 defined relative to the real-world 40.

In the examples illustrated, there is a reserved region 50. In FIG. 2B and FIG. 3B the reserved region 50 is a region of part of the real-world 40. In this example, it corresponds to the same region that is occupied by the object $42\_2$.

In the following examples, if the user 10 of a headset 20 changes between looking (has a user viewing direction 30) not towards a reserved region 50 (FIGS. 2A, 3A) and looking towards the reserved region 50 (FIGS. 2B, 3B), there is a change in an external visual indication 2 produced by the headset 20.

For example, if it is determined that the user 10 of the headset 20 is not looking towards the reserved region 50 (FIGS. 2A, 3A) the external visual indication $2\_1$ produced by the headset 20 correctly indicates a direction the user 10 is looking.

For example, if it is determined that the user 10 of the headset 20 is looking towards the reserved region 50 (FIGS. 2B, 3B) the external visual indication $2\_2$ produced by the headset 20 incorrectly indicates a direction the user 10 is looking.

In at least some examples, the reserved region 50 is variable in space and time and is dependent upon external presence detection information that comprises information about presence external to the headset 20. For example, images captured by a camera can be image processed to detect a presence of an object, or to recognize a class of object (e.g. animal or human) or to recognize a particular object (e.g. you spouse, child, or pet).

In at least some examples, the reserved region 50 is dependent upon a presence of an external real-world object 42 and tracks a location of the external real-world object 42 as the real-world object 42 moves.

In at least some examples, the reserved region 50 is dependent upon a presence of an animal or human and tracks a location of the animal or human as the animal or human moves.

In at least some examples, the reserved region 50 is dependent upon a presence of an animal or human and tracks a location of eyes of the animal or human as the animal or human moves.

The external visual indication 2 provided by the headset 20 can be any suitable visual indication. In FIGS. 4A-4C, 5A-5C, 6A-6C the external visual indication 2 is illumination provided by a selected one of a plurality of light emitting diodes (LEDs). In FIGS. 7A-7C & 8A-8C, 9A-9C & 10A-10C the external visual indication 2 is provided by a display 60 on an external portion of the headset 20.

In FIG. 4A, 4B, 4C an external visual indication $2\_1$ indicates a user viewing direction (an indicated user viewing direction) that correctly indicates and follows a viewing direction $30\_2$ of the user 10. The indicated user viewing direction is aligned with the user viewing direction $30\_2$ (the gaze direction of the user 10). As the user viewing direction $30\_2$ of the user 10 changes from down-left (FIG. 4A), down-center (FIG. 4B) to up-right (FIG. 4C) the indicated user viewing direction, indicated by the visual indication $2\_1$, changes from down-left (FIG. 4A), to down-center (FIG. 4B) to up-right (FIG. 4C). The external visual indication $2\_1$ indicates an indicated user viewing direction down-left by illuminating the bottom-left LED (FIG. 4A). The external visual indication $2\_1$ indicates an indicated user viewing direction down-center by illuminating the bottom-left LED and the bottom-right LED (FIG. 4B). The external visual indication $2\_1$ indicates an indicated user viewing direction up-right by illuminating the top-right LED (FIG. 4C). The four directions up-left, up-right, down-left, down-right can be indicated using the four top-left, top-right, bottom-left, bottom-right LEDs. The directions up, down, left, right can be indicated using the top, bottom, left, right pairs of LEDs.

In FIG. 5A, 5B, 5C an example of an effect of a reserved region 50 is illustrated. The reserved region 50 is located in the top-right gaze direction (FIG. 5C). There is no reserved region 50 located in the down-left gaze direction (FIG. 5A) or the down gaze direction (FIG. 5B). The description relating to FIGS. 5A and 5B is the same as for FIGS. 4A and 4B.

In FIGS. 5A, 5B the user 10 of the headset 20 is looking outside the reserved region 50, and the indicated user viewing direction, indicated by the visual indication 2_1, matches the user viewing direction 30_2 in which the user 10 is looking. The indicated user viewing direction indicated by the visual indication 2_1 can move to track movement of the user viewing direction 30.

In FIG. 5C the user 10 of the headset 20 is looking towards the reserved region 50, and the external visual indication 2_2 no longer indicates any indicated user viewing direction.

In FIG. 6A, 6B, 6C an example of an effect of a reserved region 50 is illustrated. The reserved region 50 is located in the top-right gaze direction (FIG. 6C). There is no reserved region 50 located in the down-left gaze direction (FIG. 5A) or the down gaze direction (FIG. 6B). The description relating to FIGS. 6A and 6B is the same as for FIGS. 4A and 4B.

In FIGS. 6A, 6B the user 10 of the headset 20 is looking outside the reserved region 50, and the indicated user viewing direction, indicated by the visual indication 2_1, matches the user viewing direction 30_2 in which the user 10 is looking. The user indicated user viewing direction indicated by the visual indication 2_1 can move to track movement of the user viewing direction 30_2.

In FIG. 6C the user 10 of the headset 20 is looking towards the reserved region 50, and the indicated user viewing direction, indicated by the visual indication 2_2, does not match the user viewing direction 30_2 in which the user 10 is looking. The indicated user viewing direction indicated by the visual indication 2_2 does not track movement of the user viewing direction 30_2 into the reserved region 50.

In FIGS. 7A-7C & 8A-8C, 9A-9C & 10A-10C, the external visual indication 2 is provided by a display 60 on an external portion of the headset 20.

FIG. 8A illustrates in detail the headset 20 of FIG. 7A. FIG. 8B illustrates in detail the headset 20 of FIG. 7B. FIG. 8C illustrates in detail the headset 20 of FIG. 7C.

FIG. 10A illustrates in detail the headset 20 of FIG. 9A. FIG. 10B illustrates in detail the headset 20 of FIG. 9B. FIG. 10C illustrates in detail the headset 20 of FIG. 9C.

In FIGS. 7A-7C & 8A-8C, the external visual indication 2_1 indicates an indicated user viewing direction 70_1 that correctly indicates and follows a user viewing direction 30_2 (a gaze direction of the user 10). The indicated user viewing direction 70_1 is aligned with the user viewing direction 30_2 (the gaze direction of the user 10). As the user viewing direction 30_2 of the user 10 changes from down-left (FIG. 7A), to down (FIG. 7B) to up-right (FIG. 7C) the external visual indication 2 indicates an indicated user viewing direction 70 by simulating a viewing direction 70 that changes from down-left (FIG. 8A), down (FIG. 8B) to up-right (FIG. 8C). The external visual indication 2 indicates a user viewing direction by displaying an image of a pair of simulated eyes 62 on the display 60 that look in the simulated direction 70.

The external visual indication 2 indicates a user viewing direction 30 that is down-left by displaying an image of a pair of simulated eyes 62 on the display 60 that look down-left (FIG. 8A). The external visual indication 2 indicates a user viewing direction 30 that is down by displaying an image of a pair of simulated eyes 62 on the display 60 that look down (FIG. 8B). The external visual indication 2 indicates a user viewing direction 30 that is up-right by displaying an image of a pair of simulated eyes 62 on the display 60 that look up-right (FIG. 8C).

In FIGS. 9A, 9B, 9C & 10A, 10B, 10C an example of an effect of a reserved region 50 is illustrated. The reserved region 50 is located in the top-right gaze direction (FIG. 9C). There is no reserved region 50 located in the down-left gaze direction (FIG. 9A) or the down gaze direction (FIG. 9B). The description relating to FIGS. 7A & 8A is also relevant to FIGS. 9A & 10A. The description relating to FIGS. 7B & 8B is also relevant to FIGS. 9B & 10B.

In FIGS. 9A, 9B the user 10 of the headset 20 is looking outside the reserved region 50, and the indicated user viewing direction 70 indicated by the external visual indication 2_1 matches the user viewing direction 30 in which the user 10 is looking. The indicated user viewing direction 70 indicated by the visual indication 2 can move to track movement of the user viewing direction 30.

In FIGS. 9A, 9B, the eyes 12 of the user 10 of the headset 20 are looking outside the reserved region 50, and consequently the display 60 on the external portion of the headset 20 is controlled to display simulated eyes 62 that look in a simulated direction 70_1 that matches a user viewing direction 30_2 in which the eyes 12 of the user 10 are looking (FIGS. 10A; 10B). The displayed simulated eyes 62 move to track movement of the eyes 12 of the user 10.

In FIG. 9C the user 10 of the headset 20 is looking towards the reserved region 50, and the indicated user viewing direction 70, indicated by the external visual indication 2_2, does not match the user viewing direction 30 in which the user 10 is looking. The user viewing direction 30 is towards the reserved region 50 and the indicated user viewing direction 70_2 is not towards the reserved region 50.

In this example, the indicated user viewing direction 70_2 is away from the reserved region 50.

Although, in this example, the indicated user viewing direction 70_2 is opposite the user viewing direction 30 in other examples the indicated user viewing direction 70_2 is different to but not necessarily opposite to the user viewing direction 30.

In this example the user viewing direction 30 is up-left and the indicated user viewing direction 70_2 is down-right direction, but it other implementations the indicated user viewing direction 70_2 is something other than up-left, for example up, up-right or left direction etc.

The indicated user viewing direction 70 indicated by the visual indication 2 does not track movement of the user viewing direction 30 into the reserved region 50.

In FIG. 9C, the eyes 12 of the user 10 of the headset 20 are looking towards the reserved region 50, and consequently the display 60 on the external portion of the headset 20 is controlled to display simulated eyes 62 on the external portion of the headset 20 that look in a simulated direction 70 that is outside the reserved region 50 (FIG. 10C). The displayed simulated eyes 62 look in a simulated direction 70 that is offset from the user viewing direction 30 the user 10 is looking such that the displayed simulated eyes 62 look in a simulated direction 70 that is outside the reserved region 50 when the eyes 12 of the user 10 are looking towards the reserved region 50.

In a do not look embodiment, if eyes 12 of the user 10 of the headset 20 are looking outside the reserved region 50, then the displayed simulated eyes 62 look in a simulated direction 70_1 that matches a user viewing direction 30 in which the user 10 is looking. If eyes 12 of the user 10 of the headset 20 are looking towards the reserved region 50, then the displayed simulated eyes 62 look in a simulated direction 70_2 that no longer matches the user viewing direction 30 in which the user 10 is looking. The simulated direction 70 is outside the reserved region 50. The displayed simulated eyes 62 no longer track movement of the eyes 12 of the user 10. The displayed simulated eyes 62 cannot look in a simulated direction 70_1 that is towards the reserved region 50.

In a do not stare embodiment, if eyes 12 of the user 10 of the headset 20 are looking outside the reserved region 50, then the displayed simulated eyes 62 look in a simulated direction 70_1 that matches a user viewing direction 30 in which the user 10 is looking. If eyes 12 of the user 10 of the headset 20 are looking towards the reserved region 50 for more than a threshold period of time, then the displayed simulated eyes 62 look in a simulated direction 70_2 that that no longer matches the user viewing direction 30 in which the user 10 is looking. The simulated direction 70 is outside the reserved region 50. The displayed simulated eyes 62 no longer track movement of the eyes 12 of the user 10. The displayed simulated eyes 62 cannot look in a simulated direction 70_1 that is towards the reserved region 50 for more than the threshold period of time.

When it is determined to offset the simulated direction 70 from the user viewing direction 30 because the user viewing direction 30 is towards the reserved region 50 then the simulated direction 70 can be placed outside the reserved region 50. The simulated direction 70 can for example be randomly determined with the constraint that it is outside reserved region(s) 50. The simulated direction 70 can for example be based on a previous simulated direction 70 or user viewing direction 30 that is outside reserved region(s) 50. That previous viewing direction can for example be an immediately preceding user viewing direction 30, or a selected one of multiple previous user viewing directions 30 that are outside reserved region(s) 50. The selection can be random or a random weighted selection where the weighting favors more recent user viewing directions 30 or viewing directions aligned with objects that are not in reserved region(s) 50. The simulated direction 70 can for example be a direction dependent upon external presence detection information, for example, aligned with an object that is not in a reserved region 50 which may be a non-human or non-animal object 42 for example.

When it is determined to offset the simulated direction 70 from the user viewing direction 30 because the user viewing direction 30 is towards the reserved region 50 then the simulated direction 70 can be varied in time such that the displayed simulated eyes 62 look in a sequence of different simulated directions 70 that are outside the reserved region 50 while the eyes 12 of the user 10 are looking towards the reserved region 50.

The sequence of different simulated directions 70 (outside the reserved region(s) 50) can for example be any combination of: randomly determined, based on previous user viewing directions 30, selection, dependent upon external presence detection information, following the previous described examples.

The sequence of different simulated directions 70 (outside the reserved region(s) 50) can for example be a previous sequence of user viewing directions 30 in which the eyes 12 of the user looked, repeated as a loop. In at least some examples, the previous sequence of user viewing directions 30 in which the eyes 12 of the user 10 looked, is a closed cycle that starts and ends with (substantially) the same user viewing direction 30 and can therefore be looped without discontinuities of simulated eye movement.

In at least some of the preceding examples, when the eyes 12 of the user 10 of the headset 20 are looking towards a reserved region 50, the display 60 on the external portion of the headset 20 is controlled to display simulated eyes 62 that conceal the true direction in which the user is looking, for example, by displaying simulated eyes that look in a simulated direction 70 that is outside the reserved region 50.

In at least some examples, there is an incognito mode available for user selection. When selected, the display 60 on the external portion of the headset 20 is controlled to display simulated eyes 62 that conceal the true direction in which the user is looking. This occurs at all times while the incognito mode is activated and is not conditional on the user looking towards a reserved region 50.

FIG. 11 illustrates an example of an apparatus 100 suitable for performing some or all the above-described functions.

In this example, the apparatus 100 comprises
means 102 for determining whether a user 10 of a headset 20 is looking towards a reserved region 50; and
means 104 for causing adaptation of an external visual indication 2 produced by the headset 20 in dependence upon the determination 103 (provided by the means 102 for determining).

In some examples, the means 102 for determining whether a user 10 of a headset 20 is looking towards a reserved region 50 comprises means for determining that the user 10 of the headset 20 is not looking towards the reserved region 50, and as a consequence of that determination causing the external visual indication 2_1 produced by the headset 20 to correctly indicate a direction the user 10 is looking (e.g. in FIGS. 10A and 10B the simulated user viewing direction 70_1 matches the actual user viewing direction 30_2 and is directed outside the reserved region 50; in FIGS. 6A and 6B the indicated user viewing direction matches the actual user viewing direction 30_2 and indicates a direction outside the reserved region 50).

In some examples, the means 102 for determining whether a user 10 of a headset 20 is looking towards a reserved region 50 comprises means for determining that the user 10 of the headset 20 is looking towards a reserved region 50, and as a consequence of that determination causing the external visual indication 2_2 produced by the headset 20 to incorrectly indicate a direction the user 10 is looking (e.g. in FIG. 10C the simulated user viewing direction 70_2 does not match the actual user viewing direction 30_2 and is directed outside the reserved region 50; in FIG. 6C the indicated user viewing direction does not match the actual user viewing direction 30_2 and indicates a direction outside the reserved region 50).

In at least some examples, the user viewing direction 30 in which a user 10 of the headset 20 is looking is determined from eye tracking information 107 provided by an eye tracking device 106). In some examples the eye tracking device 106 is comprised within the apparatus 100. In other examples, the eye tracking device 106 is not comprised within the apparatus 100 and is separate and the eye tracking information 107 is transferred between the apparatus 100 and the eye tracking device 106.

In at least some examples, the reserved region 50 is variable in space and time and is dependent upon external presence detection information 109 that comprises information about presence external to the headset 20. The external presence detection information 109 is provided by a presence detection system 108. In some examples the presence detection system 108 is comprised within the apparatus 100. In other examples, the presence detection system 108 is not comprised within the apparatus 100 and is separate and the presence detection information 109 is transferred between the apparatus 100 and the presence detection system 108.

In some examples the presence detection system 108 comprises a camera and means for image processing.

In some example, the reserved region 50 is dependent upon a presence of an external real-world object 42 and tracks a location of the external real-world object 42.

In some examples the reserved region 50 is dependent upon a presence of an animal or human and tracks a location of the animal or human. In some examples the reserved region 50 is dependent upon a presence of an animal or human and tracks a location of eyes of the animal or human.

In some examples, the apparatus is configured to enable user-control of the reserved region 50. In some examples, the apparatus is configured to enable user-definition of the reserved region. In some examples, the user can indicate the reserved region 50 as a "fixed" region (i.e. some area in the real-world). In some examples, the user can indicate the reserved region 50 as a region occupied by a specific person.

In at least some examples, the external visual indication 2 is provided by a display 60 on an external portion of the headset 20. The means 104 for causing adaptation of an external visual indication 2 provided by the headset 20 in dependence upon the determination 103 comprises means for causing adaptation of an image of eyes (simulated eyes 62) displayed on the external portion of the headset 20 in dependence upon the determination 103.

In some examples, the means for causing adaptation of an image of eyes (simulated eyes 62) displayed on the external display 60 of the headset 20 is configured to cause the simulated eyes 62 to look in a simulated direction 70_1 that matches a user viewing direction 30 the user 10 is looking (see FIG. 10A, 10B).

In some examples, the means for causing adaptation of an image of eyes (simulated eyes 62) displayed on the external portion of the headset 20 is configured to cause the displayed simulated eyes 62 to look in a direction 70_2 that no longer matches the user viewing direction 30 the user 10 is looking (see FIG. 10C).

In some examples, the means for causing adaptation of an image of eyes (simulated eyes 62) displayed on the external portion of the headset 20 is configured to cause the displayed simulated eyes 62 to look in a simulated direction 70 that is offset from the user viewing direction 30 in which the user 10 is looking such that the displayed simulated eyes 62 look in a simulated direction 70 that is outside the reserved region 50 when the eyes 12 of the user 10 are looking towards the reserved region 50 (see FIG. 10C).

In some examples, the apparatus 100 is configured, if eyes 12 of a user 10 of a headset 20 are looking towards the reserved region 50, to: display simulated eyes 62 on an external portion of the headset 20 that look in a simulated direction 70 that matches a user viewing direction 30 in which the eyes 12 of the user 10 are looking, if eyes 12 of a user 10 of a headset 20 are looking outside the reserved region 50; and to display simulated eyes 62 on the external portion of the headset 20 that look in a simulated direction 70 that is outside the reserved region 50.

In some examples, the apparatus 100 is configured to:
  (i) display simulated eyes 62 on an external portion of the headset 20 that look in a simulated direction 70 that matches a user viewing direction 30 in which the eyes

12 of the user 10 are looking, if eyes 12 of a user 10 of a headset 20 are looking outside the reserved region 50;
  (ii) display simulated eyes 62 on the external portion of the headset 20 that look in a simulated direction 70 that is outside the reserved region 50, if eyes 12 of a user 10 of a headset 20 are looking towards the reserved region 50 for longer than a threshold time period.

In some examples, the simulated direction 70 is offset from the user viewing direction 30 to be outside the reserved region 50 because the user viewing direction 70 is towards the reserved region 50. The simulated direction 70 is determined based on: a randomized direction; a previous user viewing direction 30 in which the eyes 12 of the user 10 looked; a selected direction; and a direction dependent upon external presence detection information.

In some examples, the simulated direction 70 that is offset from the user viewing direction 30 to be outside the reserved region 50 because the user viewing direction 30 is towards the reserved region 50 is varied in time such that the displayed simulated eyes 62 look in a sequence of different simulated directions 70 that are outside the reserved region 50 while the eyes 12 of the user 10 are looking towards the reserved region 50.

In some examples, the sequence of different simulated directions 70 that are offset from the user viewing direction 30 to be outside the reserved region 50 because the user viewing direction 30 is towards the reserved region 50 is determined based on one or more of: at least one randomized direction; at least one previous direction in which the simulated eyes 62 or the eyes 12 of the user 10 looked; at least one selected direction; and at least one direction dependent upon external presence detection information.

In some examples, the sequence of different simulated directions 70 is a previous sequence of directions 70 in which the simulated eyes 62 of the eyes 12 of the user 10 looked, repeated as a loop. The previous sequence of user viewing directions 30 in which the simulated eyes 62 or eyes 12 of the user 10 looked, is in some examples a closed cycle that starts and ends with (substantially) the same direction.

In some example the apparatus 100 supports an incognito mode. The apparatus 100 is configured to cause the adaptation of the external visual indication 2 produced by the headset 20 either in dependence upon the determination that the user 10 of the headset 20 is looking towards the reserved region 50 or in dependence upon a user-selectable option (the incognito mode option), wherein selection of the user selectable option causes the external visual indication 2 produced by the headset 20 to incorrectly indicate a user viewing direction 30 the user 10 is looking irrespective of whether the user 10 of the headset 20 is or is not looking towards the reserved region 50.

In some but not necessarily all examples, the apparatus 100 is configured as the headset 20.

In at least some examples, the headset 20 is configured to display content to the eyes 12 of the user 10, for example via an internal headset display. This can enable augmented reality where visual virtual content overlays visual real-world content. The visual real-world content can be captured using a camera and rendered via the internal headset display or, alternatively, in some examples, if the internal headset display is transparent or semi-transparent then real-world content is viewed through the internal headset display.

The following use case relates to augmented reality (AR), more specifically AR headsets 20 where the user's facial expressions are detected and displayed outside of the headset for others to see. The headset 20, in AR mode, can display a visual indication 2 of the user viewing direction 30

(e.g. the gaze direction) on a display 60 on the outside of the headset 20. Gaze direction is visualized by displaying a simulated eyes 62 whose simulated direction 70 matches the actual user viewing direction 30 of the user 10.

In one situation, the user 10 is wearing such a headset 20 at home with a friend present and is viewing some AR content. In AR mode, his headset 20 shows him the AR content as well as his real-life surroundings via camera capture (in this example). His actual viewing direction 30 is displayed on the outside of the headset via the simulated direction 70. Thus, he is able to simultaneously enjoy the AR content as well as talk with his friend. His friend can see the actual direction of the user's gaze (i.e. viewing direction 30) which matches the simulated direction 70; and therefore understands when the user 10 is concentrating on the AR content and when on him. This leads to natural communication between the two people.

In another situation, the user is wearing such a headset 20 in a public space where there are strangers, and is viewing some AR content. An AR object can be positioned so that it serendipitously coincides with a position of one of the strangers. Now, when the user is looking at AR object, since the user viewing direction 30 is visualized via the simulated eyes 62 having a simulated direction 70 on the display 60 on the outside of his headset 20, the stranger gets the impression that the user is staring at him or her. This can lead to awkward moments.

The user 10 could configure the headset 20 to stop displaying the simulated eyes 62 on the outside display 60 of the headset 20, but this is not an optimal solution, as the user 10 may want to interact with people in the public space and would then need to reconfigure or remove the headset 20. Furthermore, the displayed, simulated eyes 62 also serve as an indicator to other people that the user 10 is in AR mode and is able to see what's happening in his surroundings (as opposed to VR mode, where only the VR scene is visible to the user).

The apparatus 100 is configured to control displaying the visualization of the user's gaze direction 70 on the outside display 60 of the headset 20 such that certain regions 50 are configured to be "do not stare regions" (DNSR 50). The apparatus 100 controls the simulated eyes 62 visualized such that when the user 10 looks in a user viewing direction 30 towards such a DNSR 50, the simulated eyes 62 look in a different simulated direction 70. When looking any other way, the displayed simulated eyes 62 match the actual gaze direction (the user viewing direction 30) of the user 10. Thus the simulated direction 70 visualized is edited such that it appears natural but not disturbing for the external observers.

In one example, the user 10 indicates an object (person) 42_2 that he does not want the simulated eyes 62 visualized on the outside of the headset 20 to stare at. The apparatus 100 is configured to consider the person as a DNSR 50. If the user, while enjoying the AR content, looks towards the DNSR 50 (for a while), the apparatus 100 detects that the user is looking in the direction of a DNSR 50. This causes the external visual indication 2 of the simulated direction 70 to look in a different direction.

Instead of an object 42_2, the user 10 may indicate an area to be considered as a DNSR 50.

In some examples, all people (or all people not known to user 10) may automatically be individually or collectively selected as a DNSR 50.

In some examples, the apparatus 100 is configured to allow a certain time limit for looking towards a DNSR 50 before moving the externally visualized simulated direction

70 in a different direction. The 'other direction' where the displayed simulated direction 70 is moved to may be:

a random direction or set of random directions if the simulated direction 70 persists for a longer time; a direction that the user has previously looked towards; a recording of simulated direction(s) 70 from the previous N seconds of time. This may be looped if the unwanted gaze direction continues for a longer time.

In some cases, it would be advantageous for the user 10 to be able to override the no stare setting. In one example, when the user 10 wishes to intentionally engage with another person who is currently in a DNSR 50, the user 10 is able to override the no stare setting so that that DNSR 50 is temporarily or permanently deactivated so that the simulated eyes on the outside of the headset 20 again match the user's eye position as they are. For this purpose, the user 10 is able to override the no stare setting by looking directly in the eyes of the other person for a few seconds. In some embodiments, a further voice input from the user 10 is needed in addition or alternatively for the override of a no stare setting. The voice input may be, for example, speech detected towards the person the user is looking at.

In some examples, the user 10 may execute a command to enter an 'incognito mode' where the simulated direction 70 shown on the outside of the headset 20 is random or such that it never matches the user's actual gaze 30. There does not need to be any AR content being rendered on the headset 20 in this case.

FIG. 12 illustrates an example of a method 500. The method 500 comprises, at block 502, determining whether a user 10 of a headset 20 is looking towards a reserved region 50. The method 500 comprises, at block 504, causing adaptation of an external visual indication 2 produced by the headset 20 in dependence upon the determination.

FIG. 13 illustrates an example of a controller 400 suitable for use in an apparatus 100. Implementation of a controller 400 may be as controller circuitry. The controller 400 may be implemented in hardware alone, have certain aspects in software including firmware alone or can be a combination of hardware and software (including firmware).

As illustrated in FIG. 13 the controller 400 may be implemented using instructions that enable hardware functionality, for example, by using executable instructions of a computer program 406 in a general-purpose or special-purpose processor 402 that may be stored on a computer readable storage medium (disk, memory etc.) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 100 when loaded into the processor 402. The computer program instructions, of the computer program 406, provide the logic and routines that enables the apparatus to perform the methods illustrated in the accompanying FIGS. The processor 402 by reading the memory 404 is able to load and execute the computer program 406.

The apparatus 100 comprises:

at least one processor 402; and at least one memory 404 including computer program code, the at least one memory storing instructions that, when executed by the at least one processor 402, cause the apparatus at least to:

determining whether a user 10 of a headset 20 is looking towards a reserved region 50; and causing adaptation of an external visual indication 2 produced by the headset 20 in dependence upon the determination.

As illustrated in FIG. 14, the computer program 406 may arrive at the apparatus 100 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 100 may propagate or transmit the computer program 406 as a computer data signal.

Computer program instructions for causing an apparatus to perform at least the following or for performing at least the following:

determining whether a user 10 of a headset 20 is looking towards a reserved region 50; and causing adaptation of an external visual indication 2 produced by the headset 20 in dependence upon the determination.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory or memories that work together to cause an apparatus, such as a mobile phone or server, to perform various functions and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the accompanying FIGS. may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The apparatus 100 can be a module.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning, then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
at least one processor; and
at least one memory storing instructions that, when executed by the at least one processor, cause the apparatus at least to:
determine whether a user of a headset is looking towards a reserved region, wherein the reserved region is variable in space and time and is dependent upon external presence detection information that comprises information associated with a presence external to the headset; and
cause adaptation of an external visual indication produced by the headset in dependence upon the determination.

2. An apparatus as claimed in claim 1, wherein the apparatus is further caused to determine that the user of the headset is not looking towards a reserved region, and wherein the external visual indication produced by the headset is caused to indicate a direction the user is looking.

3. An apparatus as claimed in claim 1, wherein the apparatus is further caused to determine that the user of the headset is looking towards a reserved region, and wherein the external visual indication produced by the headset is caused to indicate a direction the user is not looking.

4. An apparatus as claimed in claim 1, wherein a direction in which a user of the headset is looking is determined from eye tracking information.

5. An apparatus as claimed in claim 1, wherein the reserved region is dependent upon the presence of an external real-world object and wherein the apparatus is further caused to track a location of the external real-world object.

6. An apparatus as claimed in claim 1, wherein the reserved region is dependent upon the presence of an animal or human, and wherein the apparatus is further caused to track a location of the animal or human.

7. An apparatus as claimed in claim 1, wherein the reserved region is dependent upon the presence of an animal or human, and wherein the apparatus is further caused to track a location of eyes of the animal or human.

8. An apparatus as claimed in claim 1, wherein the external visual indication is provided by a display on an external portion of the headset, wherein causing adaptation of an external visual indication by the headset in dependence upon the determination comprises causing adaptation of an image of eyes displayed on the external portion of the headset in dependence upon the determination.

9. An apparatus as claimed in claim 8, wherein causing adaptation of an image of eyes displayed on the external portion of the headset comprises causing the displayed eyes to look in a simulated user viewing direction.

10. An apparatus as claimed in claim 9, wherein causing adaptation of an image of eyes displayed on the external portion of the headset comprises causing the displayed eyes to look in a direction that no longer matches the direction the user is looking.

11. An apparatus as claimed in claim 9, wherein causing adaptation of an image of eyes displayed on the external portion of the headset comprises causing the displayed eyes to look in a direction that is offset from the direction the user is looking such that the displayed eyes look in a direction that is outside the reserved region when the eyes of the user are looking towards the reserved region.

12. An apparatus as claimed in claim 11, wherein the direction that is outside the reserved region is determined based on at least one of:

a randomized direction;

a previous direction in which the eyes of the user looked;

a selected direction; or a direction dependent upon the external presence detection information.

13. An apparatus as claimed in claim 11, wherein the direction that is outside the reserved region is varied in time such that the displayed eyes look in a sequence different directions that are outside the reserved region while the eyes of the user are looking towards the reserved region.

14. An apparatus as claimed in claim 13, wherein the sequence of different directions is based on one or more of:

at least one randomized direction;

at least one previous direction in which the eyes of the user looked;

at least one selected direction; or at least one direction dependent upon the external presence detection information.

15. An apparatus as claimed in claim 1, wherein the apparatus is further caused:

if eyes of a user of a headset are looking outside the reserved region, to display eyes on an external portion of the headset that look in a direction that matches a direction in which the eyes of the user are looking; and if eyes of a user of a headset are looking towards the reserved region, to display eyes on the external portion of the headset that look in a direction that is outside the reserved region.

16. An apparatus as claimed in claim 1, wherein the apparatus is further caused:

if eyes of a user of a headset are looking outside the reserved region, to display eyes on an external portion of the headset that look in a direction that matches a direction in which the eyes of the user are looking; and if eyes of a user of a headset are looking towards the reserved region for longer than a threshold time period, to display eyes on the external portion of the headset that look in a direction that is outside the reserved region.

17. An apparatus as claimed in claim 1, wherein the apparatus is further caused to adapt the external visual indication produced by the headset either in dependence upon the determination that the user of the headset is looking towards the reserved region or in dependence upon a user-selectable option, wherein selection of the user selectable option causes the external visual indication produced by the headset to incorrectly indicate a direction the user is looking irrespective of whether the user of the headset is or is not looking towards the reserved region.

18. A method comprising:

determining whether a user of a headset is looking towards a reserved region, wherein the reserved region is variable in space and time and is dependent upon external presence detection information that comprises information associated with a presence external to the headset; and causing adaptation of an external visual indication produced by the headset in dependence upon the determination.

19. A non-transitory computer readable medium comprising program instructions stored thereon for performing at least the following:

determining whether a user of a headset is looking towards a reserved region, wherein the reserved region is variable in space and time and is dependent upon external presence detection information that comprises information associated with a presence external to the headset; and causing adaptation of an external visual indication produced by the headset in dependence upon the determination.

* * * * *